United States Patent [19]

Hawthorn

[11] Patent Number: 5,425,551
[45] Date of Patent: Jun. 20, 1995

[54] CUSHION FOLD FOR A SUPPLEMENTAL INFLATABLE RESTRAINT SYSTEM

[75] Inventor: Laura A. Hawthorn, Vandalia, Ohio

[73] Assignee: General Motors Corporation, Detroit, Mich.

[21] Appl. No.: 168,252

[22] Filed: Dec. 17, 1993

[51] Int. Cl.⁶ ............................................. B60R 21/20
[52] U.S. Cl. ................................ 280/743.1; 280/732; 280/728.1
[58] Field of Search ............... 280/743 R, 732, 728 R, 280/730 R, 731

[56] References Cited

U.S. PATENT DOCUMENTS

| | | | |
|---|---|---|---|
| 3,625,543 | 12/1971 | Wolff | 280/150 AB |
| 3,736,004 | 5/1973 | Haruna | 280/150 AB |
| 3,799,573 | 3/1974 | McDonald | 280/150 AB |
| 4,004,828 | 1/1977 | Sogabe et al. | 280/743 |
| 4,235,453 | 11/1980 | Lawson et al. | 280/743 |
| 4,332,398 | 6/1982 | Smith | 280/732 |
| 4,830,401 | 5/1989 | Honda | 280/736 |
| 4,842,300 | 6/1989 | Ziomek et al. | 280/732 |
| 5,022,675 | 6/1991 | Zelenak, Jr. et al. | 280/743 R |
| 5,066,039 | 11/1991 | Shitanoki et al. | 280/743 R |
| 5,140,799 | 8/1992 | Satoh | 280/743 R X |
| 5,162,035 | 11/1992 | Baker | 280/843 R X |
| 5,178,407 | 1/1993 | Kelley | 280/473 R X |
| 5,275,435 | 1/1994 | Fischer | 280/728 R X |
| 5,277,230 | 1/1994 | Sollars, Jr. | 280/743 R X |
| 5,290,061 | 3/1994 | Bollaert | 280/743 R |

Primary Examiner—Margaret A. Focarino
Assistant Examiner—Christopher P. Ellis
Attorney, Agent, or Firm—Charles E. Leahy

[57] ABSTRACT

A supplemental inflatable restraint system including an air bag for use in a vehicle to restrain an occupant during an accident. The air bag is folded and placed in the module such that inflation of the air bag causes the air bag to be expelled from the module in a substantially folded condition whereby a contact face of the air bag defines a substantially flat or unfolded contact surface for initial contact with a vehicle occupant. The air bag is folded such that top and bottom edges thereof are rolled toward a central location on the air bag. During inflation, the rolled portions unroll upwardly and downwardly across the occupant.

13 Claims, 5 Drawing Sheets

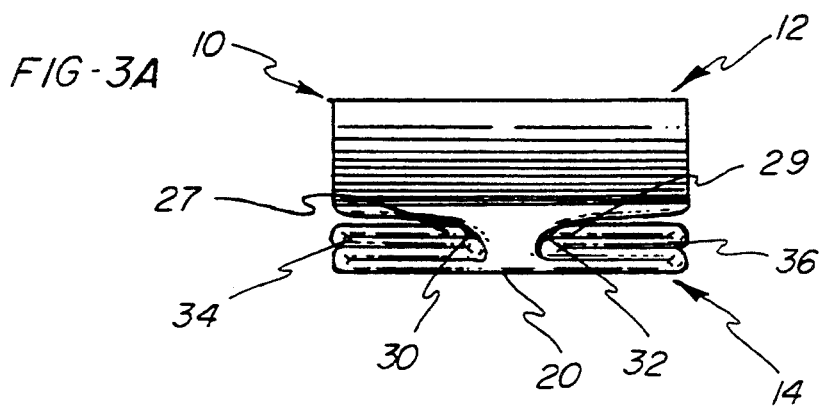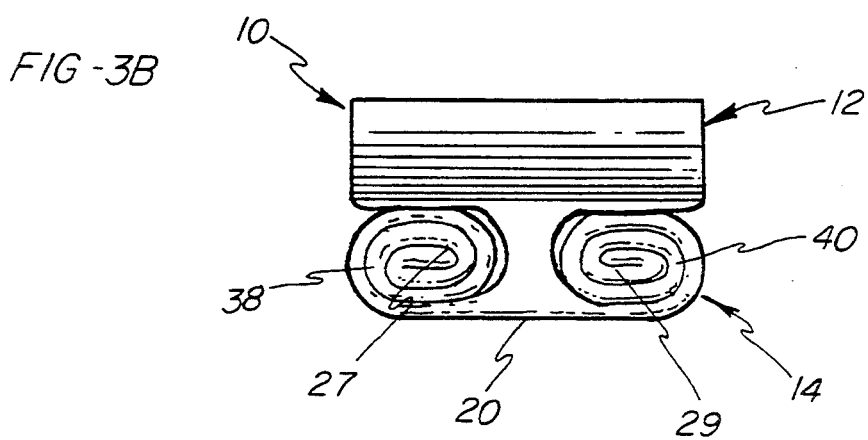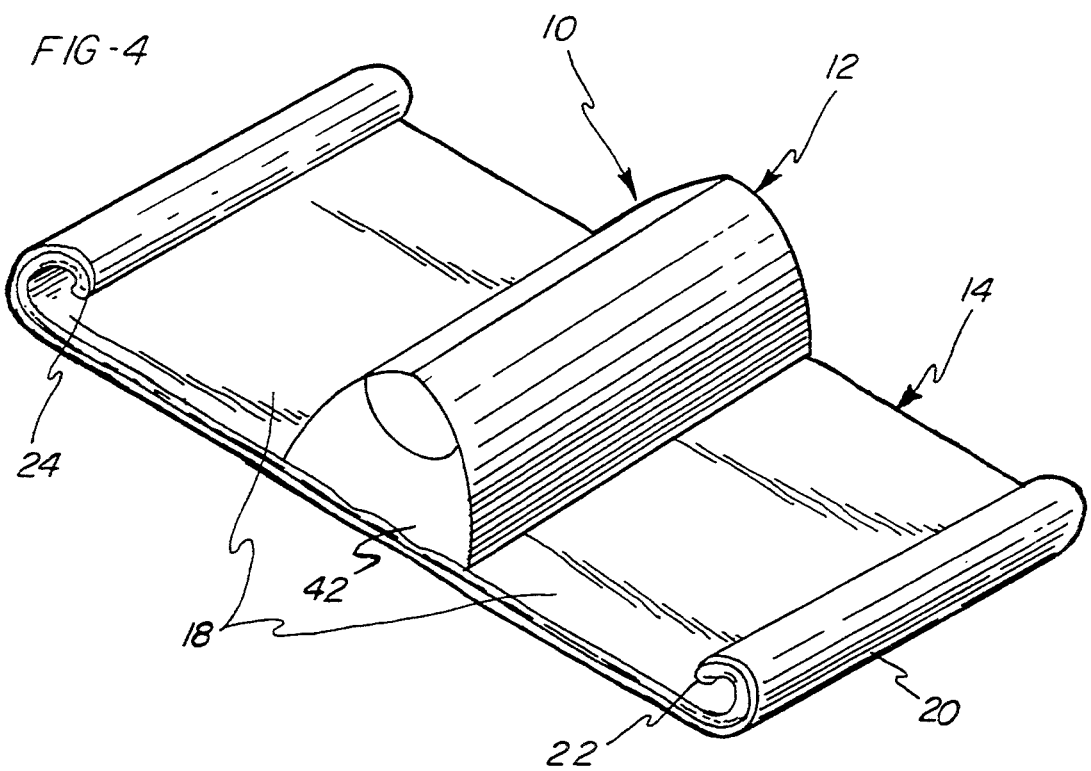

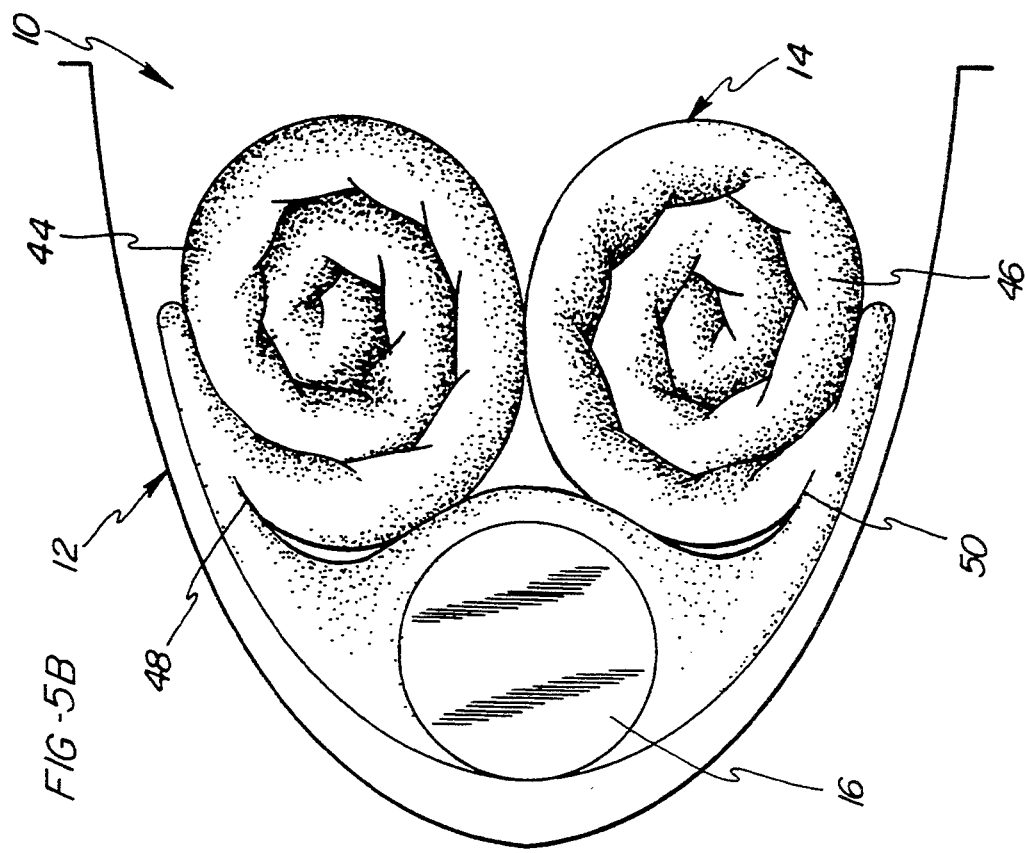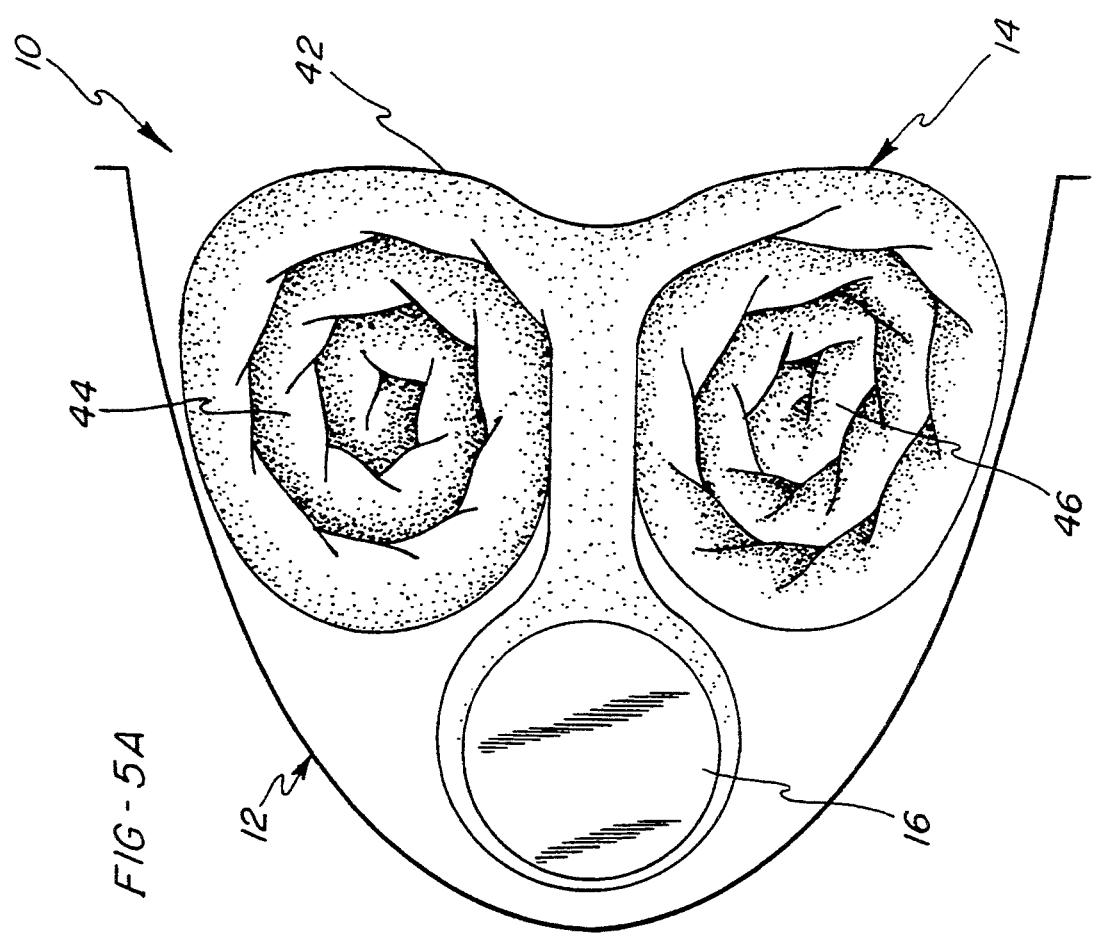

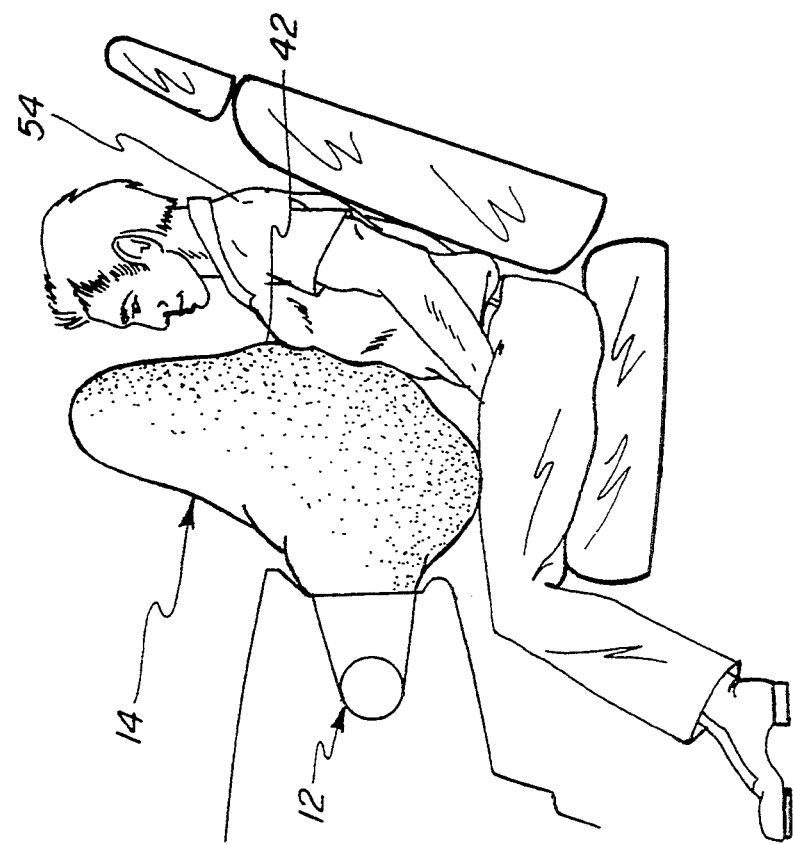
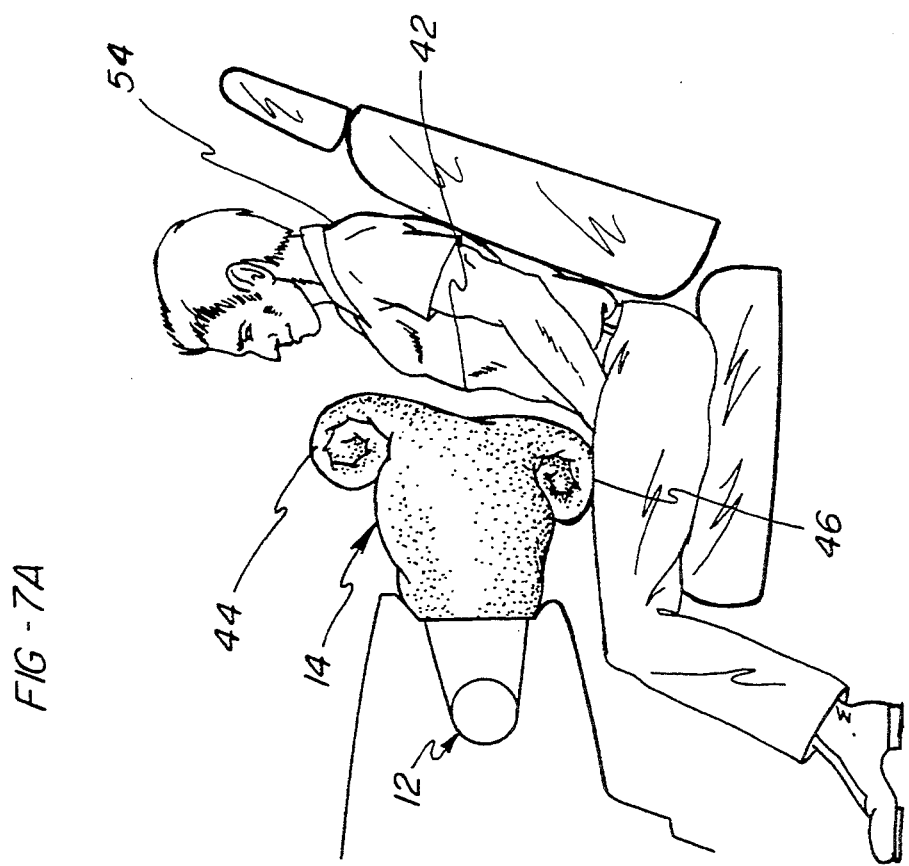

CUSHION FOLD FOR A SUPPLEMENTAL INFLATABLE RESTRAINT SYSTEM

BACKGROUND OF THE INVENTION

1. Field of the Invention

The present invention relates to a folded cushion or air bag for use in a supplemental inflatable restraint system of a vehicle and, more particularly to an air bag which is folded in a manner to obtain controlled deployment of the air bag.

2. Description of the Prior Art

An air bag is typically folded and supported in the dashboard or steering wheel of a vehicle. Commonly, the air bag has a number of folds, and when the air bag is inflated, high pressure gas is directed into the air bag to cause the air bag to unfold and inflate.

In one known supplemental inflatable restraint system, an air bag is contained within a housing mounted in the dashboard of a vehicle in order to protect the passenger side vehicle occupant. In the event of an accident, the air bag will deploy to contact the vehicle occupant as the occupant moves forwardly. Thus, the air bag will absorb energy imparted by the occupant and thereby limit forward movement of the occupant within the vehicle cabin. Various air bag fold techniques have been proposed in order to ensure that the air bag is in proper position relative to the various possible occupant positions which may occur during an accident.

SUMMARY OF THE INVENTION

It is a primary object of the present invention to provide a folded air bag wherein the method of folding the air bag is such that the air bag will deploy in a controlled manner adapted to effectively restrain occupants located in a variety of positions relative to a housing containing the air bag.

In one aspect of the invention, a supplemental inflatable restraint system is provided including an air bag having a rearward contact face for contacting an occupant and a housing including an inflator operable to inflate the air bag. The air bag is folded and placed in the housing in such a manner that actuation of the inflator causes the air bag to move out of the housing in a substantially folded state and present a generally flat central contact area, formed by the contact face, to the occupant.

In a further aspect of the invention, the air bag is placed in a flat position and defines opposing top and bottom edges extending between opposing lateral edges of the contact face. The air bag is rolled from the top and bottom edges toward the central contact area of the contact face whereby the contact face is adapted to unroll in directions upwardly and downwardly away from the central contact area during inflation of the air bag.

In yet another aspect of the invention, the lateral edges of the air bag are folded to define a lateral width for the air bag which is substantially equal to the width of an aperture in the housing for receiving the air bag. The lateral edges are preferably folded prior to the step of rolling the top and bottom edges toward the central contact area.

In a further aspect of the invention, the rolled portion of the air bag are rolled along a front face opposite from the contact face such that inflation of the air bag causes the rolled portions to unroll from a side of the air bag opposite from the vehicle occupant.

Other objects and advantages of the invention will be apparent from the following description, the accompanying drawings, and the appended claims.

BRIEF DESCRIPTION OF THE DRAWINGS

FIG. 3A is a side elevational view showing initial zig-zag or accordion lateral folds which have been tucked into the pleats illustrated in FIG. 2;

FIG. 3B is an alternative lateral fold configuration wherein the lateral folds are formed as unidirectional coiled folds;

FIG. 4 illustrates the formation of the final folds prior to insertion of the air bag into the housing;

FIG. 5A illustrates the folded air bag positioned within the housing;

FIG. 5B illustrates an alternative configuration for placing the air bag within the housing;

FIGS. 7A and 7B illustrate the deployment of the air bag folded in accordance with the present invention to restrain a normally positioned occupant.

DETAILED DESCRIPTION OF THE PREFERRED EMBODIMENT

Figure 1:
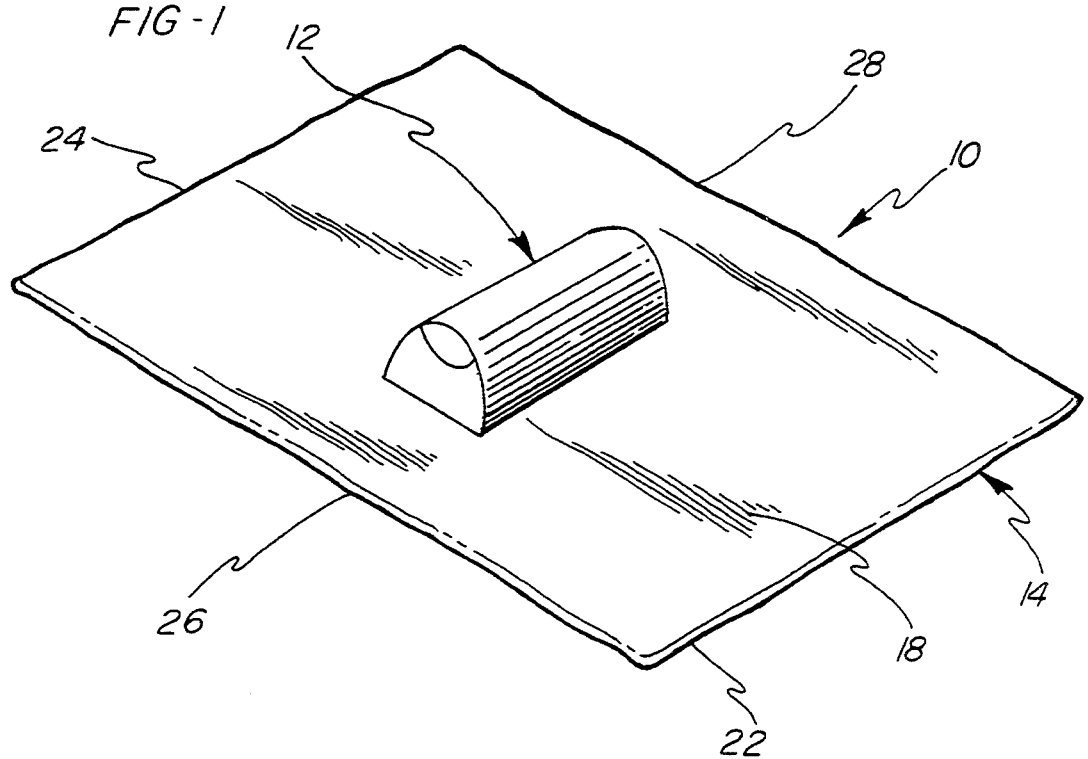
FIG. 1 is a perspective view of an air bag placed in a flat condition in preparation for folding in accordance with the present invention.

The supplemental inflatable restraint system of the present invention is particularly intended to be mounted to a vehicle dashboard in a mid-height mounting location for restraining an occupant located in the front passenger seat during a collision. As may be seen in FIGS. 1 and 2, the supplemental inflatable restraint system 10 includes a housing 12 and an air bag 14 which is attached to the housing 12 in a conventional manner. In addition, as may be seen in FIG. 5A, an inflator 16 is located inside the housing 12 in fluid communication with the interior of the air bag 14. The inflator 16 provides a pressurized gas, such as nitrogen, for deploying the air bag 14 from the vehicle dashboard.

The air bag 14 includes a forward face 18 and a rearward occupant contact face 20. In accordance with the present invention, the air bag 14 is initially placed in a flattened condition with the forward and rearward faces 18, 20 in facing relationship to each other. In this position, opposing top and bottom edges 22 and 24 are defined with first lateral edges 26, 28 extending between the top and bottom edges 22, 24.

Figure 2:
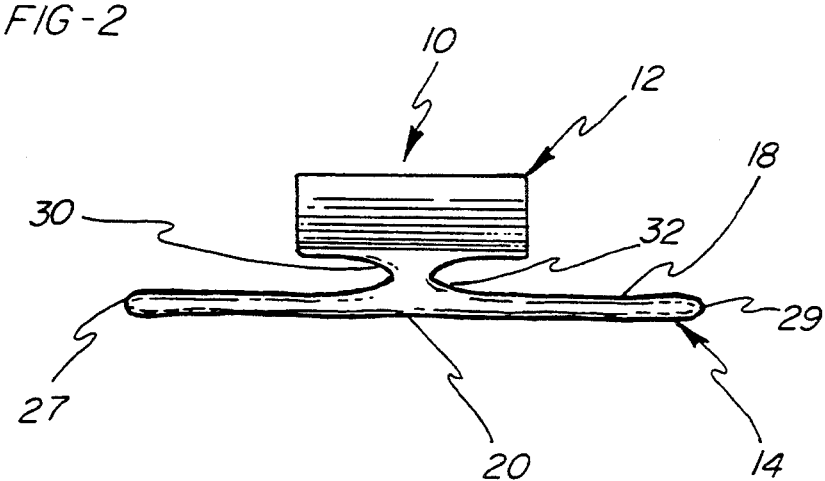
FIG. 2 is a side elevational view showing the formation of initial pleats adjacent to the housing.

The air bag 14 is initially provided with pleats 30, 32 extending parallel to the lateral edges 26, 28 on opposing sides of the housing 12, as illustrated in FIG. 2. Formation of the pleats 30, 32 results in the portions of the air bag 14 defining the first lateral edges 26, 28 being drawn inwardly whereby second lateral edges 27, 29 are defined for the air bag 14. As may be further seen in FIG. 3A, the material between the pleats 30, 32 and the second lateral edges 27, 29 is then provided with initial folds 34, 36 in the form of accordion or fan folds. The initial folds 34, 36 are tucked into the pleats 30, 32 such that the air bag 14 is folded to a width approximately equal to the width of the housing 12.

Alternatively, as seen in FIG. 3B, the lateral portions of the air bag 14 may be provided with a series of unidirectional coiled folds 38, 40, which folds define rolled portions of the air bag 14 received within the pleats 30, 32. It should be noted that in both of the embodiments shown in FIGS. 3A and 3B, the portion of the rearward face 20 facing away from the housing 12 is formed as a flat surface having no folds.

Referring to FIG. 4, the top and bottom edges 22, 24 are each rolled along the front face 18 in a direction toward a central contact area 42 defined at a central portion of the contact face 20 adjacent to the housing 12. As seen in FIG. 5A, the central contact area 42 is a substantially unfolded outwardly facing portion of the contact face 20 wherein rolled portions 44, 46 formed by the step of rolling the top and bottom edges 22, 24 are folded away from the central area 42. Further, it should be noted that the description of the portions 44, 46 as being rolled is intended to encompass similar fold techniques, such as providing a series of unidirectional folds formed in a continuous manner from the top and bottom edges 22, 24 toward the central contact area 42.

In an alternative embodiment shown in FIG. 5B, the rolled portions 44, 46 are placed on top of the central contact area 42 by providing folds 48, 50 opposite to the roll direction of the rolled portions 44, 46. The placement of the rolled portions 44, 46 in accordance with this embodiment provides a configuration which facilitates a reduction in deformation of the housing 12 when the air bag 14 is deployed.

The fold configuration of the present invention configures the air bag 14 to deploy from the housing 12 in a substantially folded condition and to subsequently unroll upwardly and downwardly during inflation of the air bag 14.

Figure 6B:
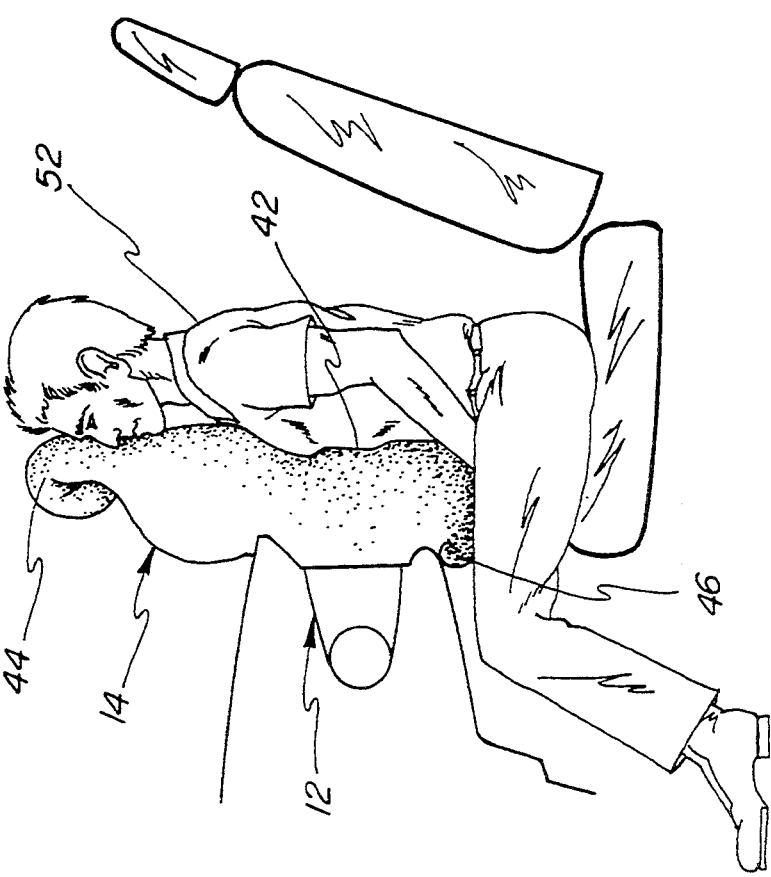
FIGS. 6A and 6B illustrate deployment of the air bag folded in accordance with the present invention to restrain a forwardly seated occupant.
Figure 6A:
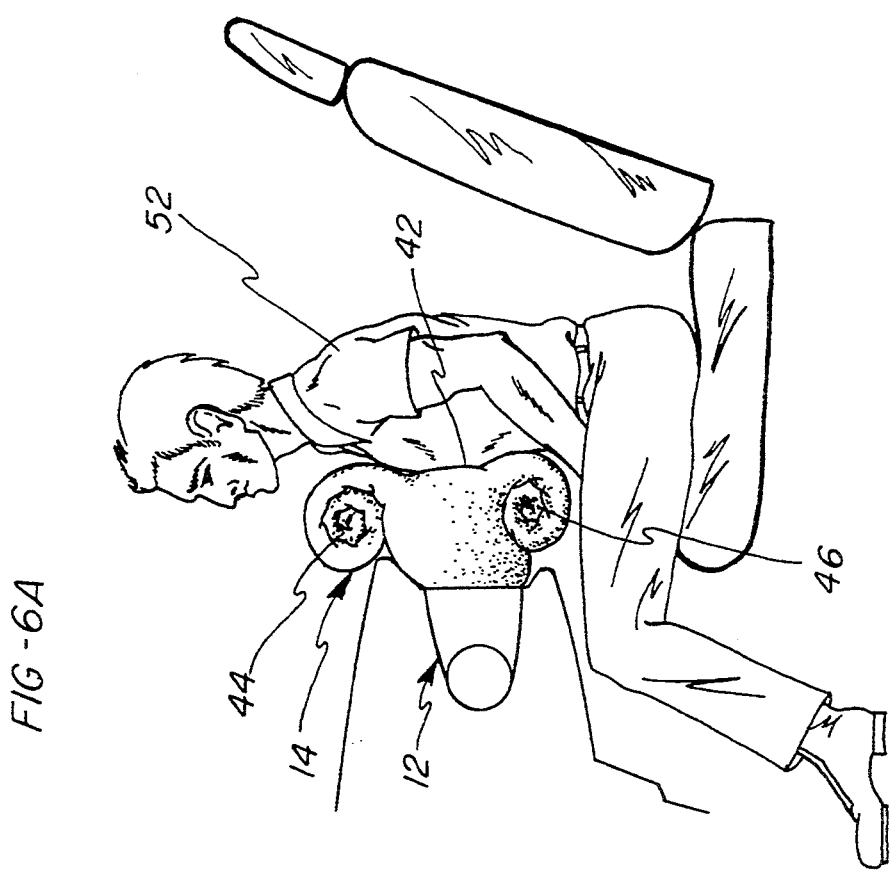

In addition, this configuration for an air bag provides a restraint system which is adapted to effectively restrain both rearwardly seated and forwardly seated occupants. This is illustrated in FIGS. 6A and 6B which illustrate a forwardly seated occupant 52 during deployment of the air bag 14, as well as in FIGS. 7A and 7B which illustrate a rearwardly seated occupant 54 during deployment of the air bag 14. As may be seen in each of these figures, an unfolded, substantially flat contact surface 42 is initially presented for contact with the occupant 52, 54, with the remaining portions 44, 46 of the air bag 14 in a folded condition. Subsequently, the remaining portions 44, 46 of the air bag 14 are unfolded as the inflation of the air bag 14 is completed.

While the form of apparatus herein described constitutes a preferred embodiment of the invention, it should be understood that this invention is not limited to this precise form of apparatus, and that changes may be made therein without departing from the scope of the invention, which is defined in the appended claims.

What is claimed is:

1. A supplemental inflatable restraint system comprising:

an air bag including a rearward contact face for contacting an occupant;

a housing including an inflator operable to inflate said air bag;

said air bag including opposing lateral edges located along side edges of said contact face;

said air bag including opposing top and bottom edges extending between said opposing lateral edges of said contact face;

said air bag including a series of final folds being unidirectional folds folded from said opposing top and bottom edges of said air bag away from said occupant along said forward face of said air bag and towards a center of said contact face to define opposing folded portions and a generally flat central contact area of said contact face;

wherein said air bag is folded and placed in said housing such that actuation of said inflator causes said air bag to move out of said housing in a substantially folded state and present the generally flat central contact area, formed by said contact face, to initially said occupant, said folded portions remaining substantially intact during initial deployment of said air bag from said housing, and said folded portions simultaneously unfolding upwardly and downwardly along said forward face away from said central contact area during subsequent inflation of the air bag such that a generally flat contact face is continuously presented to said occupant during air bag inflation.

2. The system as in claim 1, wherein said opposing folded portions comprise rolled portions.

3. The system as in claim 1, wherein said air bag is provided with initial folds along opposing lateral edges and said final folds being substantially perpendicular to said initial folds.

4. The system as in claim 3, wherein said initial folds define a lateral width for said air bag which is substantially equal to the width of an aperture in said housing for receiving said air bag.

5. An inflatable air bag for use in a supplemental inflatable restraint system, said air bag comprising:

a forward face;

a rearward contact face for contacting a vehicle occupant;

opposing lateral edges located along side edges of said contact face;

opposing top and bottom edges extending between said opposing lateral edges of said contact face; and said air bag being unidirectionally rolled from said top and bottom edges along said forward face away from said occupant to define a generally flat central contact area of said contact face and to define opposing rolled portions which remain substantially intact during initial deployment of said air bag whereby said generally flat central contact area is initially presented for contact with said vehicle occupant during initial deployment of said air bag prior to unrolling of said rolled portions of said air bag, and said rolled portions of said air bag simultaneously unroll upwardly and downwardly along said forward face and away from said central contact area during subsequent inflation of said air bag such that a generally flat contact face is continuously presented to said occupant during air bag inflation.

6. The inflatable air bag as in claim 5, wherein said contact face includes a single fold opposite to the roll direction of said rolled portions to place said rolled portions rearward said contact face.

7. The inflatable air bag as in claim 5, including a series of initial folds extending between said lateral edges and said central contact area wherein said initial folds are formed prior to formation of said rolled portions.

8. The inflatable air bag as in claim 7, wherein said initial folds are formed as accordion folds.

9. The inflatable air bag as in claim 7, wherein said initial folds are formed as unidirectional folds.

10. The inflatable air bag as in claim 7, including a pair of pleats formed in said front face substantially parallel to said lateral edges, wherein said initial folds are tucked into said pleats prior to formation of said rolled portions.

11. A method of folding an air bag for use in a supplemental inflatable restraint system comprising the steps of:

providing an air bag having a rearward contact face for contacting a vehicle occupant, an opposite forward face, and opposing top and bottom edges;

providing a housing for receiving said air bag, said housing including means for inflating said air bag;

folding and placing said air bag in said housing such that actuation of said means for inflating said air bag causes said air bag to be expelled from said housing in a substantially folded condition such that said contact face defines a substantially flat contact surface for initial contact with the vehicle occupant; and said folding of said air bag comprising unidirectionally rolling said opposing top and bottom edges of said air bag along said forward face away from said occupant and towards each other to form opposing rolled portions.

12. The method as in claim 11, wherein said step of folding said air bag comprises folding lateral edges of said air bag substantially perpendicular to said opposing top and bottom edges prior to said step of rolling said opposing top and bottom edges.

13. The method as in claim 11, wherein said step of folding said air bag comprises placing said rolled portions rearward said contact face by folding said rolled portions in a direction opposite said roll direction.

* * * * *